United States Patent Office 2,963,501
Patented Dec. 6, 1960

2,963,501

ORGANOSILYL PEROXIDES

Edwin P. Plueddemann, Midland, Mich., assignor to Dow Corning Corporation, Midland, Mich., a corporation of Michigan No Drawing. Filed Apr. 6, 1959, Ser. No. 804,121

2 Claims. (Cl. 260—448.2)

This invention relates to organosiloxanes having peroxy substituents attached to silicon through a siliconcarbon linkage.

It has long been known that organic peroxides, particularly aromatic acyl peroxides and ditertiary peroxides are excellent vulcanizing agents for siloxanes. These materials are at the present time widely employed in the commercial production of siloxane rubbers. However, the presently employed organic peroxides suffer from two disadvantages. One is in relation to those peroxides which are solids. In this case it is difficult or impossible to adequately disperse the peroxide in the siloxane polymer sufficiently well so that there is an even vulcanization throughout the material. In other words, there is an overabundance of cross links produced wherever there is a particle of the solid peroxide, and a lack of cross links in those areas where there is no peroxide particles. Although this uneven distribution is not serious in connection with relatively thick articles, it becomes particularly deleterious in thin films. In these cases there can actually be holes developed in the film in those areas where a crystal of the peroxide existed prior to vulcanization.

The difficulties encountered with the crystalline peroxides are partially avoided by the use of liquid peroxides which can be dispersed more thoroughly in the siloxane polymers. However, the liquid peroxides heretofore known are either incompatible with siloxane polymers and/or are volatile materials so that the peroxide slowly evaporates from the silicone rubber stocks while they are in storage. In those cases where incompatibility of the liquid peroxide with the siloxane exists, one has the same difficulties of uneven vulcanization as with the solid peroxides. In those cases where the liquid peroxide is volatile it is quite a disadvantage since it is necessary to vulcanize the stock shortly after compounding. This is not always convenient or possible.

It is the object of this invention to provide a method of avoiding the above difficulties by producing novel peroxides which are both nonvolatile and which are completely miscible with organopolysiloxanes. Another object is to provide novel compositions of matter which are useful for vulcanizing organopolysiloxane rubbers or resins. Other objects and advantages will be apparent from the following description.

This invention relates to organosiloxanes in which at least one siloxane unit per molecule is selected from the group consisting of siloxane units of the formula

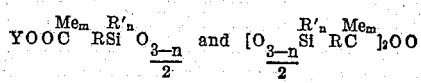

in which Y is hydrogen, a non-aromatic hydrocarbon radical, a non-aromatic halohydrocarbon radical or an acyl radical of the formula R″C=O in which R″ is hydrocarbon or halogenated hydrocarbon, m is an integer from 1 to 2 inclusive, R is a hydrocarbon radical of less than 12 C atoms, R′ is of the group hydrocarbon or halohydrocarbon radicals of less than 7 C atoms, and n is an integer from 0 to 2 inclusive, any remaining siloxane units in said siloxane composition being of the formula

in which Z is a hydrocarbon or halogenated hydrocarbon radical and $a$ has an average value from 1 to 3 inclusive.

For the purpose of this invention the term "non-aromatic hydrocarbon" for Y means that there is no aromatic hydrocarbon radical attached directly to the oxygen. The term "non-aromatic halogenated hydrocarbon radical" means that there is no halogenated aromatic hydrocarbon radical attached directly to the oxygen. Me as employed in the specification and claims is the methyl radical and Ph is the phenyl radical.

The distinguishing feature of the compositions of this invention is the fact that the peroxide linkage occurs in a substituent group which is attached to the silicon by a silicon-carbon linkage. These groups are hereinafter called "peroxy" groups. It can be seen that each of the peroxy groups contains the configuration

in which C is a tertiary carbon atom. When this C atom is a part of a ring system (for example, a cyclohexyl ring), m is 1. When the tertiary C atom is attached to a ring system or when it is part of a chain, m is 2.

The peroxides of this invention may be prepared by several methods, which may be represented by the following schematic equations in which D represents the group

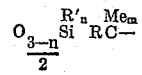

The best method will depend upon the nature of the Y group. In those cases where Y is a saturated hydrocarbon or saturated halohydrocarbon radical, the peroxides are best prepared by reacting the corresponding siloxane alcohols with sulfuric acid to form the sulfate and then reacting this sulfate with hydroperoxides in accordance with the equation

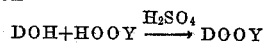

In these cases where Y is hydrogen the peroxides are best prepared by reacting the corresponding organosilicon alcohols with sulfuric acid to form the sulfate and then reacting this product with hydrogen peroxide. This reaction also generally gives some of the bis-siloxane peroxide in accordance with the equation

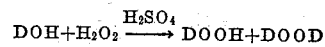

In those cases where Y is an acyl group the peroxides are best prepared by reacting the corresponding organosilicon hydroperoxides with the corresponding acyl chloride in the presence of a hydrogenhalide acceptor such as pyridine in accordance with the equation

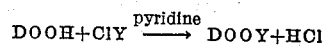

In those cases where Y is an unsaturated hydrocarbon or halohydrocarbon radical the peroxides are best prepared by reacting the K salts of the siloxane hydroperoxide with a halogenated olefin in accordance with the equation

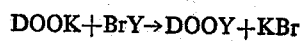

In all of the above reactions it is necessary to maintain sufficiently low temperatures so as not to cleave groups from the silicon atoms or decompose the peroxides. In general, the reactions are carried out at temperatures ranging from −25° C. to +25° C. If desired, somewhat higher temperatures may be employed in the step involving reacting the hydroperoxides or hydrogen peroxide with the sulfates.

A second general method which can be employed to prepare siloxanes having hydroperoxy groups attached to the silicon involves the selective oxidation of organosilicon compounds containing units of the formula

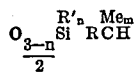

This method is particularly adaptable where R' is an oxidation resistant group such as methyl, phenyl or trifluoropropyl. When oxygen is passed through the siloxane at a temperature of 80 to 100° C., selective oxidation of the tertiary carbon occurs to produce the corresponding hydroperoxide of the formula

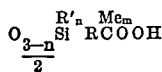

The organosiloxane alcohols of the formula DOH which are employed in the process of this invention are best prepared by reacting unsaturated alcohols with siloxanes containing SiH groups in the presence of a platinum catalyst such as chloroplatinic acid. Satisfactory reaction generally occurs at temperatures below 150° C.

For the purpose of this invention Y can be hydrogen or any non-aromatic hydrocarbon or non-aromatic halohydrocarbon radical such as aliphatic hydrocarbon and halohydrocarbon radicals such as methyl, ethyl, isopropyl, octadecyl, 3-methyl, 1,1-dimethyl-2-propynyl, allyl, bromo-propyl, perfluorobutyl, chloroamyl and chloroisopropyl; cycloaliphatic hydrocarbon and halohydrocarbon radicals such as 1-methylcyclopentyl, 1-methyl-2-chlorocyclopentyl, cyclohexyl, cyclohexenyl, cyclopentenyl, 1,2-dimethylcyclohexenyl, and aralkyl hydrocarbon and halohydrocarbon radicals such as benzyl, cumyl, p-chlorocumyl, triphenylmethyl and β-phenylethyl. Y can also be any acyl radical such as acetyl, hexoyl, octadecoyl, acryloyl, cyclohexoyl, naphthoyl,

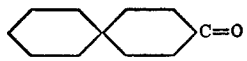

bromobenzoyl, and chloroacetyl.

For the purpose of this invention R can be any hydrocarbon radical of less than 12 carbon atoms such as

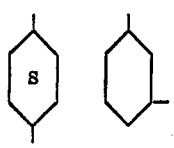

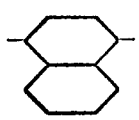

Also for the purpose of this invention R' can be any hydrocarbon or halohydrocarbon radical of less than 7 carbon atoms such as methyl, ethyl, isopropyl, butyl, hexyl, phenyl, cyclohexyl, chloromethyl, 3,3,3-trifluoropropyl, chlorophenyl, bromophenyl, 2,3-dichlorophenyl, fluorophenyl, and pentafluorobutyl.

As can be seen the peroxy siloxanes of this invention can be homopolymers in which each of the silicon atoms has one of the peroxy groups attached thereto. The siloxanes can also be copolymers in which some of the siloxane units are of the formula

in which Z is any hydrocarbon or halohydrocarbon radical and $a$ has an average value from 1 to 3 inclusive. Thus the siloxanes of this invention may contain units of the type $Z_3SiO_{1/2}$, $Z_2SiO$, $ZSiO_{3/2}$ and $SiO_2$.

Specific examples of Z groups are any hydrocarbon radical such as aliphatic hydrocarbon radicals such as methyl, ethyl, vinyl, octadecyl, hexenyl and isopropyl; cycloaliphatic hydrocarbon radicals such as cyclopentyl, cyclohexenyl and cyclohexyl; alkaryl hydrocarbon radicals such as benzyl and β-phenylethyl and aromatic hydrocarbon radicals such as tolyl, phenyl, xenyl and naphthyl. Z can also be any halogenated hydrocarbon radical such as chloromethyl, trifluorovinyl, α,α,α-trifluorotolyl, chlorophenyl, pentabromophenyl, pentafluorobutyl, heptafluoroamyl and chlorocyclohexyl.

The homopolymers in which each silicon has a peroxy group attached thereto are best prepared starting with a siloxane in which each silicon has a hydrogen attached thereto. These may then be reacted with an unsaturated alcohol in the presence of platinum as shown above to replace each of the hydrogens with an alcohol group. The resulting alcohol substituted siloxane is then converted into the peroxy siloxane by any of the above methods.

The copolymers of this invention are best prepared by reacting a copolymeric siloxane in which at least one silicon per molecule has a hydrogen attached thereto with an unsaturated alcohol as above described.

The siloxanes of this invention can have any degree of polymerization and may range from fluids to non-flowing gums or resins.

The products of this invention can be used for any of the purposes for which peroxides are generally employed such as catalysts for the polymerization of olefins and as catalysts for the vulcanization of siloxane rubbers and resins. They can also be used as intermediates in the production of organofunctional organosilicon compounds.

The following examples are illustrative only and should not be construed as limiting the invention which is properly delineated in the appended claims.

*Example 1*

172 grams of

were mixed with 330 grams of

and 15 drops of a chloroplatinic acid solution in t-butanol which contained .2% by weight Pt. This mixture was added slowly to a reactor at a temperature of 119 to 125° C. After addition was complete the mixture was heated 2 hours at 125 to 126° C. The resulting product was distilled to give a fluid material of the formula

boiling 110 to 116° C. at 45 mm. and having a $d^{25}$ of 0.865.

46.8 grams of this alcohol were mixed with 30 grams of 70% H₂SO₄ with cooling at 0 to 5° C. This converted the alcohol to the corresponding sulfate. 25 g. of t-butyl hydroperoxide were then added at a temperature of −10° C. The mixture was stirred for 6 hours and allowed to warm slowly to 25° C. The product was then cleaned up by separating the acid layer and washing the organic layer with water, then with sodium bicarbonate solution and then with water. Finally the product was dried over anhydrous sodium sulfate. The residue was stripped by heating up to 50° C. at 1 mm. The product was a liquid peroxy-siloxane having the formula

This material boiled with decomposition at a temperature of 70 to 75° C. at .6 mm.

Example 2

93.6 grams of the alcohol

were mixed with 60 grams of 70% sulfuric acid at −5° C. The mixture was stirred at −20° C. while 15 grams of a 50% aqueous solution of hydrogen peroxide were added. The mixture was then stirred while it was allowed to warm to room temperature. The product was cleaned up as in Example 1 and then stripped in a rotating evaporator for 4 hours at 50 to 60° C. at 1 mm. The product was a liquid and was a mixture of the hydroperoxide

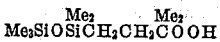

and the bis-silyl peroxide

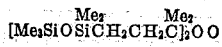

Example 3

A mixture of 170 g. of

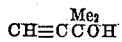

250 grams of pentamethyldisiloxane and 20 drops of the platinum solution of Example 1 was refluxed for 5.5 hours as the temperature rose from 82 to 120° C. The mixture was then distilled to give the product boiling 95 to 96° C. at 17 mm. having $d^{25}$ 0.873 and having the formula

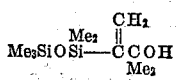

60 grams of 70% sulfuric acid were added to 92 g. of this alcohol at −5° C. 40 grams of t-butyl hydroperoxide were then added with stirring at the same temperature. The mixture was then allowed to warm at room temperature over a period of 5 hours and the product was cleaned up as in Example 1. The resulting product was then distilled to give a liquid boiling 60 to 62° C. at .5 mm. and having the formula

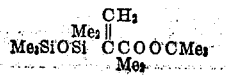

Example 4

A mixture of 272 g. of limonene

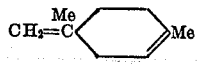

300 g. of pentamethyldisiloxane and 15 drops of the platinum solution of Example 1 was refluxed 10 hours at 123 to 170° C. The product was distilled to give the olefin

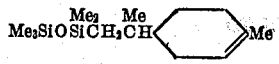

boiling point 100° C. at 1 mm. and having a $d^{25}$ 0.871.

86 grams of this product were mixed with 40 g. of 70% sulfuric acid at −10° C. The sulfuric acid added to the double bond of the cyclohexyl ring to produce the corresponding tertiary sulfate. 43 grams of t-butyl hydroperoxide were then added at a temperature of −10° C. The mixture was warmed to 25° C., cleaned up by the method of Example 1 and then stripped to 70° C. at 2 mm. There was obtained 75 g. of a clear oil having the formula

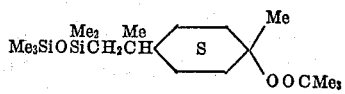

The same product is obtained when β-terpineol

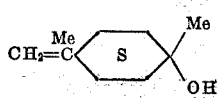

is employed in the place of the limonene in the above reaction.

Example 5

207 grams of

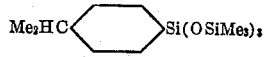

were emulsified with 203 g. of water, 1.2 g. of sodium stearate and 3.1 g. of sodium carbonate. The emulsion was stirred and heated at 85° C. as a stream of oxygen was passed over the surface for a period of 68 hours. The cumyl groups were oxidized to the hydroperoxide to give the compound

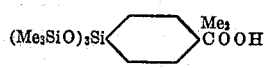

Example 6

When one mol of

is reacted with four mols of

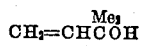

by the method of Example 1 and the resulting product is reacted with H₂SO₄ and then with monochloro-t-butylhydroperoxide in the manner of Example 1, the product

is obtained.

Example 7

When the following siloxanes are substituted in the procedure of Example 1, the following peroxy-siloxanes are obtained.

| Siloxane | Peroxy-Siloxane |
|---|---|
| $Si[OSiPhMeH]_4$ | $Si[OSiCH_2CH_2\overset{Me_2}{\underset{Me}{\overset{Ph}{C}}}OOCMe_3]_4$ |
| $PhSi[O\overset{Me}{\underset{H}{Si}}CH_2CH_2CF_3]_3$ | $PhSi[O\overset{Me}{Si}CH_2CH_2\overset{Me_2}{\underset{CH_2}{\underset{CH_2}{\underset{CF_3}{C}}}}OOCMe_3]_3$ |
| $Me_3SiO\underset{Me}{\overset{\text{(2-Cl-cyclohexyl)}}{Si}}H$ | $Me_3SiO\overset{Me}{Si}CH_2CH_2\overset{Me_2}{C}OOCMe_3$ (with 4-Cl-cyclohexyl) |
| $Me_3SiO\underset{Me}{\overset{CH_2=CH-}{Si}}H$ | $Me_3SiO\overset{CH_2=CH-}{\underset{Me}{Si}}CH_2CH_2\overset{Me_2}{C}OOCMe_3$ |
| $(CF_3CH_2CH_2)_3SiO\overset{Me_2}{Si}H$ | $(CF_3CH_2CH_2)_3SiO\overset{Me_2}{Si}CH_2CH_2\overset{Me_2}{C}OOCMe_3$ |
| A copolymer of 1 mol percent $\underset{H}{MeSiO}$ | A copolymer of 1 mol percent $Me\overset{O}{Si}CH_2CH_2\overset{Me_2}{C}OOMe_3$ |
| 20 mol percent diethylsiloxane, 20 mol percent monopropylsiloxane, 20 mol percent cyclohexylbutylsiloxane and 19 mol percent α,α,α-trifluorotolylmethylsiloxane. | 20 mol percent diethylsiloxane, 20 mol percent monopropylsiloxane, 20 mol percent cyclohexylbutylsiloxane, and 19 mol percent α,α,α-trifluorotolylmethylsiloxane. |

Example 8

When a molar excess of the following hydroperoxides are reacted with a 5 N solution of KOH in methanol at 0° C. to give the corresponding K salt of the hydroperoxide and the resulting salt is dissolved in acetone and the following halides are added thereto at room temperature, the following peroxy-siloxanes are obtained.

| Hydroperoxide | Halide | Peroxy Siloxane |
|---|---|---|
| $Me_3SiO\overset{Me_2}{Si}CH_2CH_2\overset{Me_2}{C}OOH$ | $BrCH_2CH_2CF_3$ | $Me_3SiO\overset{Me_2}{Si}CH_2CH_2\overset{Me_2}{C}OOCH_2CH_2CF_3$ |
| $Me_3SiO\overset{Me_2}{Si}CH_2CH_2\overset{Me_2}{C}OOH$ | $BrCH_2CH=CH_2$ | $Me_3SiO\overset{Me_2}{Si}CH_2CH_2\overset{Me_2}{C}OOCH_2CH=CH_2$ |
| $Me_3SiO\overset{Me_2}{Si}CH_2CH_2\overset{Me_2}{C}OOH$ | $Br\text{-}C_6H_4\text{-}S\text{-}$ | $Me_3SiO\overset{Me_2}{Si}CH_2CH_2\overset{Me_2}{C}OO\text{-}C_6H_4\text{-}S\text{-}$ |

Example 9

When the following alcohols are reacted with pentamethyldisiloxane in accordance with the procedure of Example 1 and the resulting siloxane alcohols are reacted with t-butyl hydroperoxide in accordance with that example, the following peroxy-siloxanes are obtained.

| Alcohol | Siloxane Alcohol | Peroxy-Siloxane |
|---|---|---|
| $CH_2=CH(CH_2)_5\overset{Me_2}{C}OH$ | $Me_3SiO\overset{Me_2}{Si}(CH_2)_7\overset{Me_2}{C}OH$ | $Me_3SiO\overset{Me_2}{Si}(CH_2)_7\overset{Me_2}{C}OOCMe_3$ |

Example 10

When

Me₃SiOSiCH₂CH₂COOH  (with Me₂ on Si)

is reacted with the following acyl halides in pyridine solution at a temperature between 20 and 30° C. the following peroxy-siloxanes are obtained:

| Acyl Halide | Peroxy-Siloxane |
|---|---|
| Acetyl chloride | Me₃SiOSiCH₂CH₂COOOCMe (with Me₂ groups), $\parallel$ O |
| Benzoyl chloride | Me₃SiOSiCH₂CH₂COOOC-C₆H₅ (with Me₂ groups), $\parallel$ O |
| 2,4-dichlorobenzoyl chloride | Me₃SiOSiCH₂CH₂COOOC-C₆H₃Cl₂ (with Me₂ groups), $\parallel$ O, Cl |
| Chloroacetyl chloride | Me₃SiOSiCH₂CH₂COOOCCH₂Cl (with Me₂ groups), $\parallel$ O |

Example 11

This example shows the utility of the peroxides of this invention as vulcanizing agents for silicone rubbers.

The peroxy-siloxane of Example 1 was milled in the amounts shown below with 100 parts by weight of a vinyldimethyl endblocked dimethylpolysiloxane gum having a Williams plasticity of .063 and 60 parts by weight of a finely divided silica xerogel having trimethylsiloxy groups attached to the surface thereof. Each sample was then molded 15 minutes at 150° C. and thereafter heated 24 hours at 250° C. The physical properties of the resulting products are given in the table below.

| Parts by wt. peroxy-siloxane | Durometer | Tensile strength in p.s.i. | Percent elongation at break | Percent tension set |
|---|---|---|---|---|
| 0.40 | 59 | 1,600 | 850 | 13 |
| 0.79 | 61 | 1,885 | 790 | 7 |
| 1.58 | 62 | 1,915 | 740 | 5 |
| 3.16 | 62 | 1,740 | 710 | 8 |
| 6.32 | 62 | 1,375 | 610 | 5 |

In each case the peroxide was easily and completely dispersed in the siloxane polymer during milling.

A sample of the compounded stock which contained 1.58 parts by weight of the peroxy-siloxane was allowed to stand at room temperature for 10 weeks. The compound was then heated 15 minutes at 150° C. and thereafter cured 24 hours at 250° C. The properties obtained after each cure were as follows.

| Cure | Durometer | Tensile strength in p.s.i. | Percent elongation at break | Percent tension set |
|---|---|---|---|---|
| 150° C | 38 | 1,920 | 960 | 18 |
| 250° C | 61 | 1,860 | 670 | 7 |

Example 12

The peroxy-siloxane mixture of Example 2 was added to the gum-filler combination of Example 11 in the following amounts. The resulting products were then heated 15 minutes at 185° C. and thereafter cured 4 hours at 250° C. The results are shown in the table below.

| Parts by wt. peroxy-siloxane | Durometer | Tensile strength in p.s.i. | Percent elongation at break | Percent tension set |
|---|---|---|---|---|
| 4.72 | 59 | 1,635 | 650 | 12 |
| 9.44 | 62 | 1,420 | 565 | 14 |

Example 13

Vulcanization of the gum-silica composition of Example 11 occurred when the material was mixed with 2.28 parts by weight of the peroxy-siloxane of Example 4 and thereafter heated 20 minutes at 150° C. and then 24 hours at 250° C. The resulting rubber had the following properties: durometer 50, tensile in p.s.i. 1160, per cent elongation at break 760 and percent tension set 9.

Example 14

Vulcanization of the siloxane to a rubber is obtained when a dimethylpolysiloxane gum, a dimethylpolysiloxane fluid of 10,000 cs. viscosity, a phenylmethylpolysiloxane gum, a 3,3,3-trifluoropropylmethylpolysiloxane gum and an ethylmethylpolysiloxane gum are each milled with 35 parts by weight of a fume silica per 100 parts by weight siloxane and then vulcanized with the peroxy-siloxane of Example 1 by heating 20 minutes at 150° C. and thereafter 24 hours at 250° C.

Example 15

Rubbers are obtained when a dimethylpolysiloxane gum is vulcanized with any of the peroxy-siloxanes of Examples 5 through 10 inclusive.

From the above examples it can be seen that the peroxy-siloxanes of this invention can be used to vulcanize any polysiloxane to a rubber. The amount of peroxy-siloxane employed is not critical. Preferably it can vary from .1 part by weight to 30 parts by weight per 100 parts polysiloxane. The optimum amount of peroxy-siloxane will vary with the polysiloxane gum employed and with the mol percent of peroxy group in the peroxy siloxane. Thus the higher the mol percent peroxy group in the peroxy siloxane the lower is the parts by weight peroxy siloxane needed to give any particular degree of vulcanization.

It should be understood that the peroxy siloxanes of this invention can be employed with any siloxane rubber compositions either unfilled or filled with any of the commonly known siloxane rubber fillers. These peroxy-siloxane vulcanizing agents can also be employed in compositions containing any of the additives such as compression set additives, heat stabilizers and the like which are employed in siloxane rubbers.

The peroxy siloxanes of this invention are active as vulcanizing agents at temperatures above about 100° C.

That which is claimed is:

1. As a composition of matter, an organo-siloxane in which at least one siloxane unit per molecule is selected from the group consisting of siloxane units of the formula $$YOOC^{R'_n} R Si^{Me_m} O_{\frac{3-n}{2}} \quad \text{and} \quad [O_{\frac{3-n}{2}} Si^{R'_n} RC^{Me_m}]_2 OO$$

in which Y is selected from the group consisting of hydrogen, aliphatic hydrocarbon radicals, aliphatic halohydrocarbon radicals, cycloaliphatic hydrocarbon radicals, cycloaliphatic halohydrocarbon radicals, aralkyl radicals, aralkyl halohydrocarbon radicals and acyl radicals of the formula R"C=O in which R" is selected from the group consisting of hydrocarbon and halogenated hydrocarbon radicals, $m$ is an integer of from 1 to 2 inclusive, C is a tertiary carbon atom, the relationship of C to Me and R being such that when C is an atom in a ring of which R constitutes the remaining part of said ring there is one Me group attached to C and such that when C is attached to R through a single carbon-carbon bond there are two Me groups attached to C, R is a hydrocarbon radical of less than 12 carbon atoms and is attached to the Si through a silicon-carbon linkage, R' is selected from the group consisting of monovalent hydrocarbon and monovalent halohydrocarbon radicals of less than 7 carbon atoms, and $n$ is an integer from 0 to 2 inclusive, any remaining siloxane units in said siloxane composition being of the formula $$Z_a SiO_{\frac{4-a}{2}}$$

in which Z is selected from the group consisting of monovalent hydrocarbon radicals and monovalent halohydrocarbon radicals and $a$ has an average value from 1 to 3 inclusive.

2. A siloxane composition of the formula

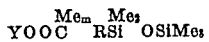

in which Y is a tertiary hydrocarbon radical in which the tertiary carbon atom is attached to the oxygen, R is a hydrocarbon radical of less than 12 carbon atoms and is attached to the Si through a silicon-carbon linkage, $m$ is an integer of from 1 to 2 inclusive, and C is a tertiary carbon atom, the relationship of C to Me and R being such that when C is an atom in a ring of which R constitutes the remaining portion of said ring there is one Me group attached to C and such that when C is attached to R through a single carbon-carbon bond there are two Me groups attached to C.

References Cited in the file of this patent

UNITED STATES PATENTS

| | | |
|---|---|---|
| 2,397,727 | Daudt | Apr. 2, 1946 |
| 2,692,887 | Berry | Oct. 6, 1954 |

FOREIGN PATENTS

| | | |
|---|---|---|
| 1,154,135 | France | Oct. 28, 1957 |

OTHER REFERENCES

Pike et al.: "Chemistry and Industry," Sept. 28, 1957, p. 1294.